United States Patent [19]

Igari

[11] Patent Number: 4,962,544

[45] Date of Patent: Oct. 9, 1990

[54] RADIO RECEIVER

[75] Inventor: Kenji Igari, Iwaki, Japan

[73] Assignee: Alpine Electronics Inc., Tokyo, Japan

[21] Appl. No.: 364,751

[22] Filed: Jun. 9, 1989

[30] Foreign Application Priority Data

Jun. 10, 1988 [JP] Japan .................. 63-143073

[51] Int. Cl.$^5$ ........................................ H04B 11/16
[52] U.S. Cl. .................................. 455/186; 455/188; 455/158
[58] Field of Search ............... 455/180, 188, 190, 168, 455/345, 346, 348, 185, 186, 158; 307/10 AT; 340/825.25; 361/422

[56] References Cited

U.S. PATENT DOCUMENTS 4,048,570  9/1977  Sumi .................................. 455/188
4,303,944  12/1981  Kitamura .......................... 455/188

Primary Examiner—Reinhard J. Eisenzopf
Assistant Examiner—Curtis Kuntz
Attorney, Agent, or Firm—Guy W. Shoup; Paul J. Winters

[57] ABSTRACT

A radio receiver having a theft prevention system using an anti-theft code, wherein a region code, corresponding to various regions in the world, is inputted by a user to set the receiver to the proper receiving standards of the selected region, and wherein an anti-theft code is inputted by the user. If the anti-theft code inputted by the user corresponds with a previously stored anti-theft code, the receiving standards are set within the receiver and the receiver is enabled.

2 Claims, 2 Drawing Sheets

RADIO RECEIVER

BACKGROUND OF THE INVENTION

The present invention relates to a radio receiver capable of changing a receiving standard according to different broadcasting standards in various regions of the world, and more particularly to a radio receiver capable of switching the receiving standard by an input code consisting of a region code and an anti-theft code for a theft prevention system.

An electronic tuning type radio receiver is used in various regions of the world owing to its high accuracy and ease of tuning. However, as receiving standards such as frequency band, channel step, modulation degree, de-emphasis, etc. are different depending on the various regions, a radio receiver maker has manufactured and sold various radio receivers in correspondence with broadcasting standards in the various regions as destinations such as U.S.A., Germany, Europe, Oceania, Southeast Asia, Middle and Near East, South Africa, Japan, etc. The radio receiver itself is so constucted as to adapt the receiving standards to correspond to the broadcasting standards in the various regions of the world, and the correspondence between the receiving standards and the broadcasting standards is set by setting a region code with a pin in correspondence with the destination.

Thus, the receiving standard in the conventional radio receiver is set in correspondence with the broadcasting standard in the region identified by the region code set and locked by the pin (the region code cannot be freely set by a user). Accordingly, although the radio receiver can receive a given broadcasting in the destination, it cannot receive broadcastings in other regions.

SUMMARY OF THE INVENTION

It is an object of the present invention to provide a radio receiver which enables a user to freely set any one of the region codes corresponding to various receiving standards.

It is another object of the present invention to provide a worldwide radio receiver which enables a user to set a receiving standard by inputting a setting code consisting of a region code and an anti-theft code for a theft prevention system and switch the receiving standard in correspondence with a broadcasting standard desired by the user.

According to the present invention, there is provided a radio receiver having a theft prevention system using an anti-theft code, comprising first means for preliminarily storing region codes corresponding to various regions in the world and for preliminary storing receiving standards in said various regions corresponding to said region codes; second means for preliminary storing a first anti-theft code; means for inputting one of said region codes stored in said storing means and for inputting an anti-theft code; and means for switching said receiving standards according to one of said region codes when said one of said region codes is input into said inputting means and after an anti-theft code is input into said inputting means which corresponds with said first anti-theft code.

In operation, when a specific code consisting of the region code and the anti-theft code, both preliminarily stored in the first and second storing means, is input by the inputting means, the receiving standard corresponding to the region code input is set. Further, when another region code stored in the storing means is input by the inputting means, the receiving standard previously set is switched to another one by the receiving standard switching means. Additionally, after the specific anti-theft code is input, the radio receiver can be started to operate.

Other objects and features of the invention will be more fully understood from the following detailed description and appended claims when taken with the accompanying drawings.

DETAILED DESCRIPTION OF THE PREFERRED EMBODIMENT

Figure 1:
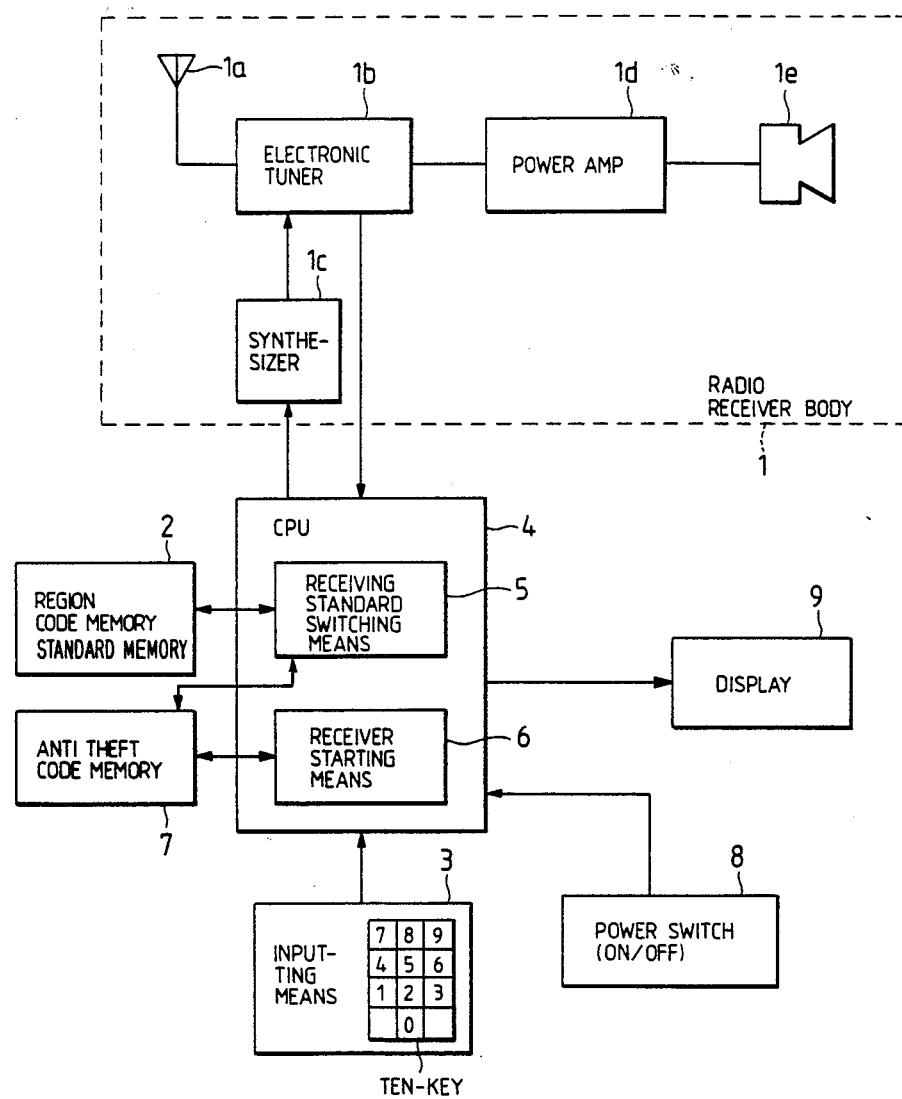
FIG. 1 is a schematic block diagram of an essential part of the radio receiver according to a preferred embodiment of the present invention.

Referring to FIG. 1, reference numeral 1 generally designates a radio receiver body including an antenna 1a, electronic tuner 1b, PLL synthesizer 1c, power amplifier 1d, speaker 1e, etc. The electronic tuner 1b is provided with receiving bands corresponding to FM/AM broadcasting standards in all over the world.

Reference numeral 2 designates a region code memory as storing means. Receiving standards corresponding to region codes for various regions in the world are preliminarily stored in the region code memory 2 in a production step. Examples of the region codes are as follows:

| Code No. | Region |
|---|---|
| 1 | U.S.A. |
| 2 | Germany |
| 3 | Europe |
| 4 | Oceania |
| 5 | Southeast Asia |
| 6 | Middle and Near East |
| 7 | Japan |

Reference numeral 3 designates inputting means for inputting an anti-theft code and a region code by using a ten-key having keys 0-9. The above-mentioned region codes 1-7 correspond to the keys 2-7 of the ten-key, respectively.

Reference numerals 4 designates a CPU for controlling the radio receiver. The CPU 4 includes receiving standard switching means 5, radio receiver starting means 6, etc. The receiving standard switching means 5 functions to switch a receiving standard according to the region code stored in the region code memory 2 when the region code has been input from the inputting means 3.

The radio receiver starting means 6 is provided for the purpose of preventing theft, and it functions to normally operate the receiver body 1 after a specific password (anti-theft code) has been input from the inputting means 3. The CPU 4 is connected to an anti-theft code memory 7, power switch 8 and display 9. The anti-theft code specified for the receiver is preliminarily stored in the anti-theft code memory 7 in the production step or by a user. When the power switch 8 is turned on, and an arbitrary anti-theft code is input by the ten-key, the CPU 4 collates the anti-theft code input with the anti-theft code stored in the anti-theft code memory 7. If both the anti-theft codes accord to each other, the receiver starting means 6 starts the receiver, while if both the anti-theft codes do not accord to each other, the receiver starting means 6 inhibits operation of the receiver 1.

In operation, the region code and the anti-theft code constitute an input code, and when the input code is input, anti-theft is cancelled and the selected receiving standard is implemented by the radio receiver. As the input code depends on the anti-theft code, the input code will be hereinafter referred to as the anti-theft code.

As described by the following expression (1), the input code (the anti-theft code) is expressed by six figures for example consisting of the region code, indicated by the number of a first figure, and a personal code indicated by the numbers of the remaining five figures.

$$1\ 2\ 3\ 4\ 5\ 6 \qquad (1)$$

Accordingly, the receiver starting means 6 starts the receiver 1 by collating in collating means 10 this anti-theft code "1 2 3 4 5 6".

The receiving standard switching means 5 then sets the receiving standard of the receiver 1, such as frequency band, channel step, modulation degree, de-emphasis, etc. to a U.S. standard in accordance with the region code "1" identified by the number of the first figure of the anti-theft code "1 2 3 4 5 6". The CPU 4 sets an FM receiving band to 76–108 MHz, a search step in seeking of the FM receiving band to 25 kHz, a search step in seeking of an AM receiving band to 200 kHz, etc., in accordance with the U.S. standard. If the region code "7", corresponding to a Japanese standard, is input instead of the region code "1", corresponding to the U.S. standard, the CPU 4 sets the FM receiving band to 76–90 MHz, the search step in seeking of the AM receiving band to 100 kHz, etc.

Figure 2:
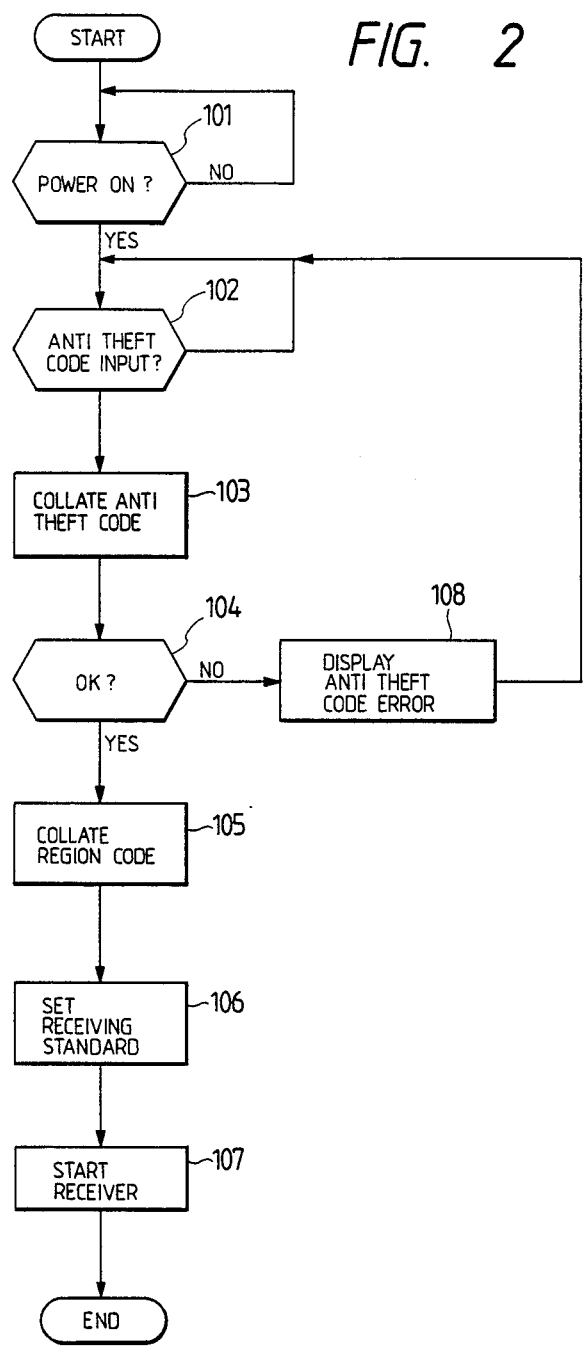
FIG. 2 is a flow chart of the operation of the preferred embodiment.

Referring to FIG. 2, which shows a flow chart of the above-mentioned operation, if the power switch 8 is turned on (step 101), and the input code (anti-theft code) is input (step 102), the personal code consisting of five figures is collated with that stored in the anti-theft code memory 7 (step 103). If both the personal codes accord to each other (step 104), the region code is collated with that stored in the region code memory 2 (step 105).

The receiving standard is the set according to the region code (step 106), and the receiver 1 is started (step 107) to end the program.

In step 104, if both the personal codes do not accord to each other, input error of the anti-theft code is displayed by the display 9 (step 108) to return the program to step 102.

Although the personal code consists of five figures and the region code consists of one figure to constitute the anti theft code in the above preferred embodiment, the number of figures representing the personal code and the region code may be appropriately set.

Further, after the power switch 8 is turned on, an appropriate message such as "Input Region Code" may be displayed by the display 9 so that a user may input the anti-theft code in an interactive manner.

Futher, the receiving standard set in step 106 may be locked.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A radio receiver having a theft prevention system using an anti-theft code, said theft prevention system comprising:

first means for preliminarily storing region codes corresponding to various regions in the world and for preliminarily storing receiving standards in said various regions corresponding to said region codes;

second means for preliminarily storing a first anti-theft code;

means for inputting one of said region codes stored in said first storing means and for inputting an anti-theft code; and means for switching said receiving standards according to said one of said region codes when one of said region codes is input into said inputting means and aftter an anti-theft code is input into said inputting means which corresponds with said first anti-theft code, said switching means coupled to said first storing means, to said second storing means, and to said inputting means.

2. A radio receiver having a theft prevention system using anti-theft code, said theft prevention system comprising:

first means for preliminarily storing region codes corresponding to various regions in the world and for preliminarily storing receiving standards in said various regions corresponding to said region codes;

second means for preliminarily storing a first anti-theft code;

means for inputting one of said region codes stored in said first storing means and for inputting an anti-theft code;

collating means coupled to said first storing means, to said second storing means, and to said inputting means;

means for switching said receiving standards according to one of said region codes when said one of said regions codes is input into said inputting means, said switching means coupled to said collating means; and means for starting said receiving after said receiving standards have been switched in accordance with the input of said one of said region codes and after an anti-theft code is input which corresponds with said first anti-theft code, and starting means coupled to said collating means.

* * * * *

UNITED STATES PATENT AND TRADEMARK OFFICE
CERTIFICATE OF CORRECTION

PATENT NO. : 4,962,544
DATED : October 9, 1990
INVENTOR(S) : Kenji Igari

It is certified that error appears in the above-identified patent and that said Letters Patent is hereby corrected as shown below:

Title Page: Item [54] and in Column 1
Title should read: --RADIO RECEIVER USING ANTI-THEFT CODE FOR THEFT PREVENTION--

Col. 4, Line 30
"aftter" should read --after--

Col. 4, Line 55
First instance of "receiving" should read --receiver--

Signed and Sealed this

Seventh Day of January, 1992

Attest:

HARRY F. MANBECK, JR.

*Attesting Officer*  *Commissioner of Patents and Trademarks*